(12) United States Patent
Huang

(10) Patent No.: US 9,537,975 B2
(45) Date of Patent: Jan. 3, 2017

(54) SERVER, CLIENT, AND METHOD OF RECONFIGURING NETWORK PARAMETERS

(71) Applicant: HON HAI PRECISION INDUSTRY CO., LTD., New Taipei (TW)

(72) Inventor: Chuan-Che Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 111 days.

(21) Appl. No.: 14/481,386

(22) Filed: Sep. 9, 2014

(65) Prior Publication Data
US 2015/0281397 A1  Oct. 1, 2015

(30) Foreign Application Priority Data

Mar. 25, 2014  (TW) .............................. 103111091 A

(51) Int. Cl.
*G06F 15/167* (2006.01)
*H04L 29/08* (2006.01)
*H04L 29/06* (2006.01)

(52) U.S. Cl.
CPC ............ *H04L 67/34* (2013.01); *H04L 63/0442* (2013.01)

(58) Field of Classification Search
USPC ........................ 709/221, 220, 227, 228, 245
See application file for complete search history.

(56) References Cited

FOREIGN PATENT DOCUMENTS

| CN | 1701561 B | 5/2010 |
| CN | 102123157 A | 7/2011 |
| TW | 200633469 A | 9/2006 |

*Primary Examiner* — Lan-Dai T Truong
(74) *Attorney, Agent, or Firm* — Zhigang Ma

(57) ABSTRACT

A server determines whether network parameters corresponding to a client have been updated, and sends a first check package and a second check package to the client. The client determines whether the server is safe according to the first check package and the second check package, and sends a reconfiguration request to the server upon condition that the server is safe. The server sends the updated network parameters to the client for reconfiguration after receiving the reconfiguration request.

15 Claims, 4 Drawing Sheets

SERVER, CLIENT, AND METHOD OF RECONFIGURING NETWORK PARAMETERS

FIELD

Embodiments of the present disclosure generally relate to network parameter reconfiguration, and more particularly to a network parameter reconfiguration method, a server, and a client.

BACKGROUND

In a computer network, servers manage and distribute network parameters, which are used by clients to execute functions of the network. When the network parameters are updated, the server sends the updated network parameters to the client through the network to allow the client to continue using functions of the network.

DETAILED DESCRIPTION

The embodiments are illustrated by way of example and not by way of limitation in the figures of the accompanying drawings in which like references numerals indicate similar elements. It should be noted that references to "an" or "one" embodiment in this disclosure are not necessarily to the same embodiment, and such references can mean "at least one."

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
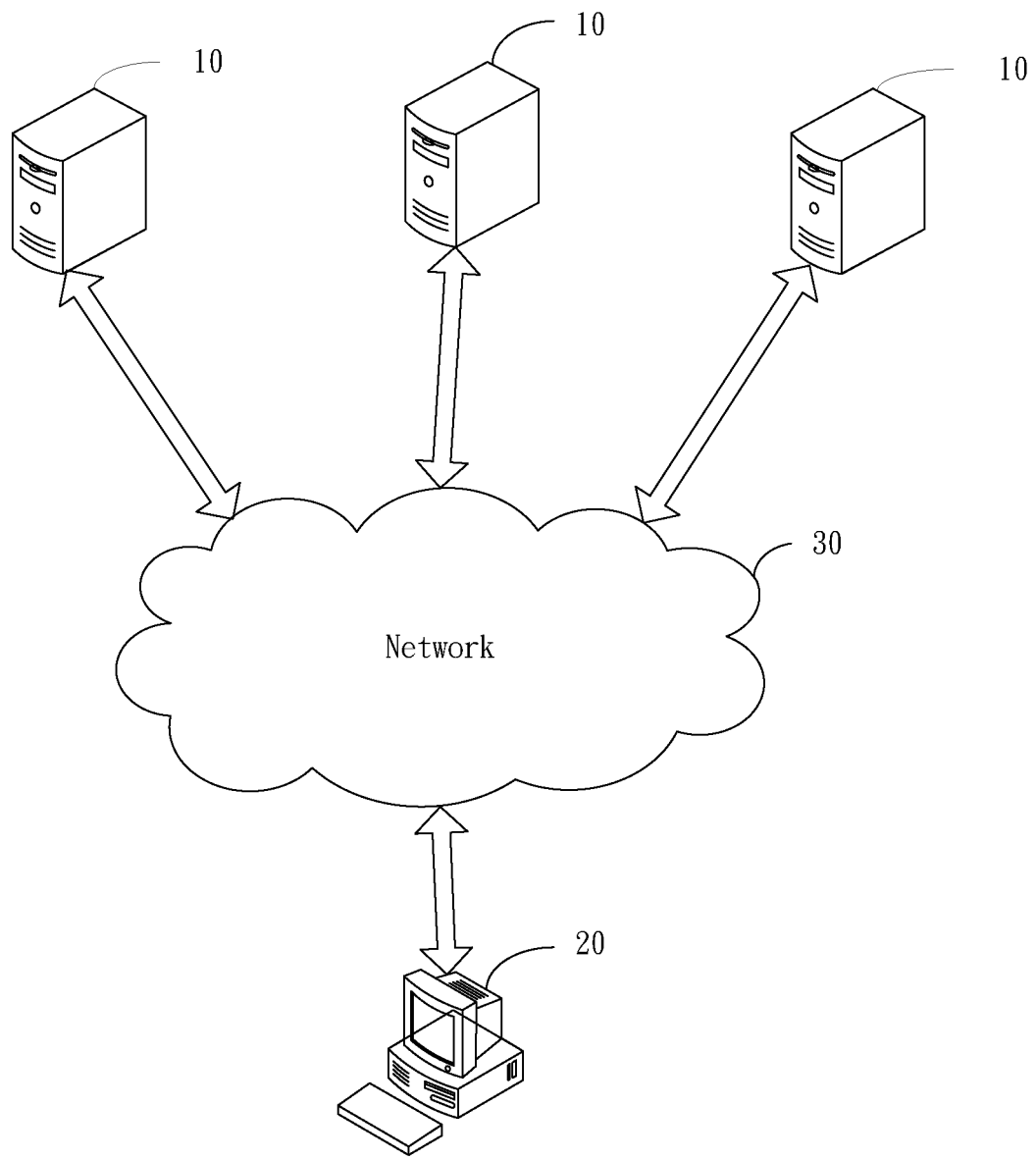
FIG. 1 is a schematic diagram of an embodiment of an application environment of a server and a client.

FIG. 1 illustrates a schematic diagram of an embodiment of an application environment of a plurality of servers 10, a client 20, and a network 30. In the present embodiment, the servers 10 are each a DHCPv6 server, the client 20 is a DHCPv6 client, and the network 30 is an IPv6 network. To illustrate the embodiment clearly, one server 10 is mainly described. In the present embodiment, the server 10 checks for updates of network parameters of the network 30, and distributes the updated network parameters to the client 20 through the network 30. In one embodiment, the network parameters can include addresses and a prefix of the network 30. Thus, the client 20 can execute functions of the network 30. It is to be understood that the network parameters can include other parameters that can be used by the client 20 to execute functions of the network 30.

The server 10 sends the updated network parameters to the client 20, so that the client 20 can reconfigure the network parameters. In the embodiment, the client 20 can determine whether it is safe to receive the updated network parameters from the server 10 (i.e., the server 10 has not been altered by malicious persons) before reconfiguring the network parameters.

Figure 2:
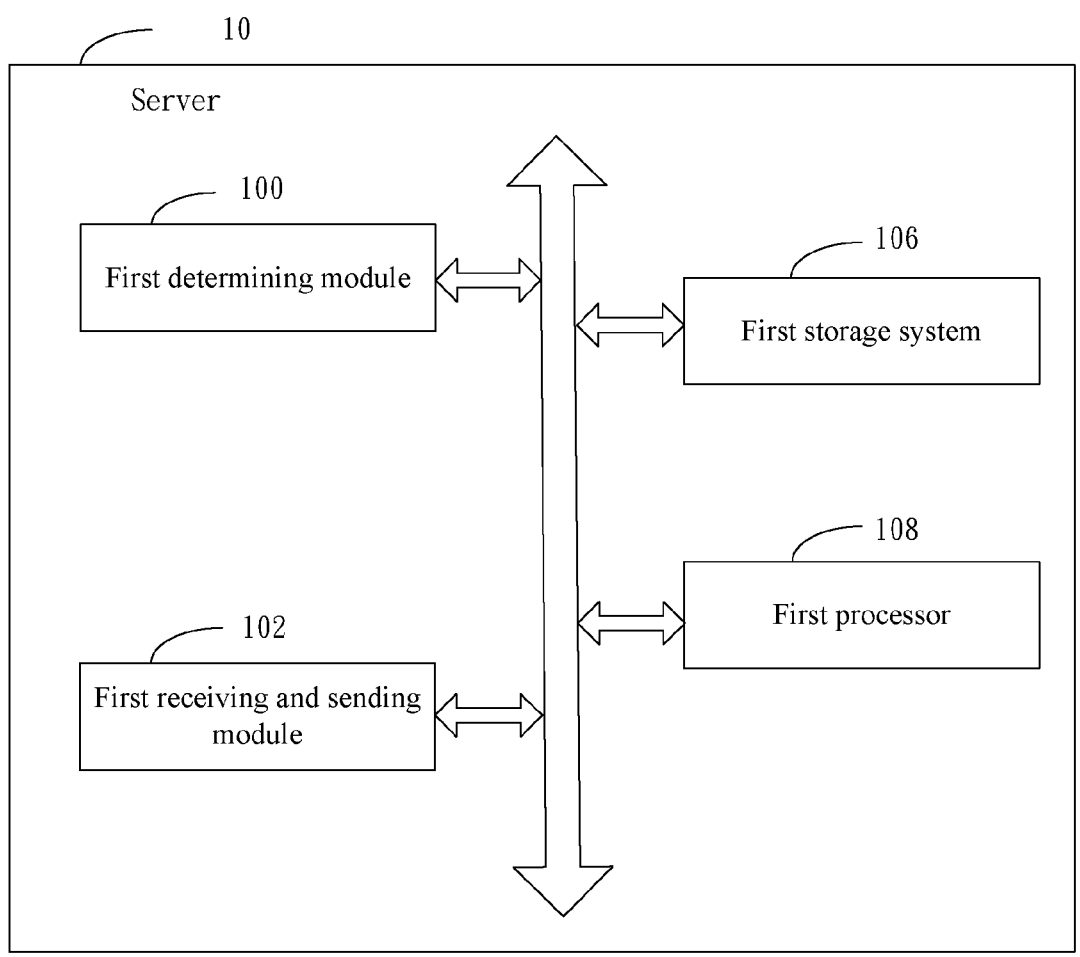
FIG. 2 is a block diagram of an embodiment of function modules of the server.
Figure 3:
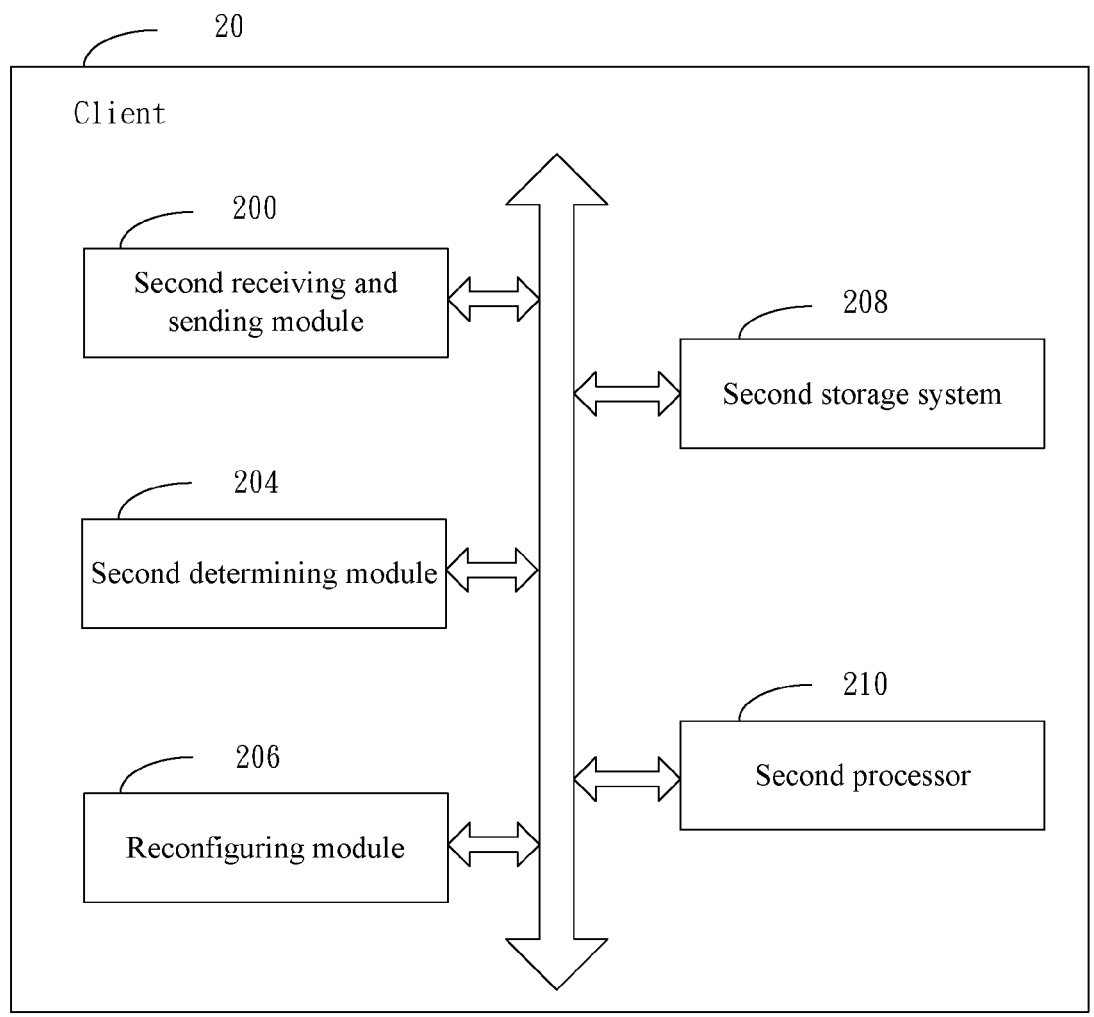
FIG. 3 is a block diagram of an embodiment of function modules of the client.

FIG. 2 illustrates a block diagram of an embodiment of function modules of the server 10. FIG. 3 illustrates a block diagram of an embodiment of function modules of the client 10. In the embodiment, the server 10 comprises a first determining module 100, a first receiving and sending module 102, a first storage system 106, and a first processor 108. The client 20 comprises a second receiving and sending module 200, a second determining module 204, a reconfiguring module 206, a second storage system 208, and a second processor 210.

The modules of the server 10 and of the client 20 can comprise one or more software programs in the form of computerized codes stored in the first storage system 106 and the second storage system 208, respectively. The computerized codes of the server 10 include instructions executed by the first processor 108 to provide functions for the modules 100-108, and the computerized codes of the client 20 include instructions executed by the second processor 210 to provide functions for the modules 200-210.

The first determining module 100 determines whether the network parameters of the network 30 have been updated.

When the network parameters of the network 30 have been updated, the first receiving and sending module 102 sends a first check package and a second check package to the client 20. The first check package and the second check package are used to determine whether it is safe to receive the updated network parameters from the server 10. In the present embodiment, the first check package includes a first media access control (MAC) address and a first number, and the second check package includes a second MAC address and a second number. In the present embodiment, the first MAC address and the second MAC address are both a MAC address of the server 10. The first number is generated randomly, and the second number is generated according to the first number and a preset relationship. In the present embodiment, the preset relationship is adding 1 to the first number to get the second number. In other embodiments, the second number can be generated according to the first number and a different preset relationship.

The second receiving and sending module 200 receives the first check package and the second check package sent by the server 10.

The second determining module 204 determines whether the server 10 is safe according to the first MAC address and the second MAC address, and further according to the first number and the second number. In the present embodiment, when the first MAC address is the same as the second MAC address, and a relationship between the first number and the second number is the preset relationship, the server 10 is safe. Otherwise, if any of the first MAC address, the second MAC address, the first number, or the second number have been changed, the server 10 is unsafe. When the server 10 is safe, the second receiving and sending module 200 sends a reconfiguration request to the server 10.

The first receiving and sending module 102 receives the reconfiguration request. When the reconfiguration request has been received, the first receiving and sending module 102 sends the updated network parameters of the network 30 to the client 20.

The reconfiguring module 206 reconfigures the network parameters according to the updated network parameters. In the present embodiment, when the client 20 reconfigures the network parameters, the client 20 can execute the functions of the network 30.

Figure 4:
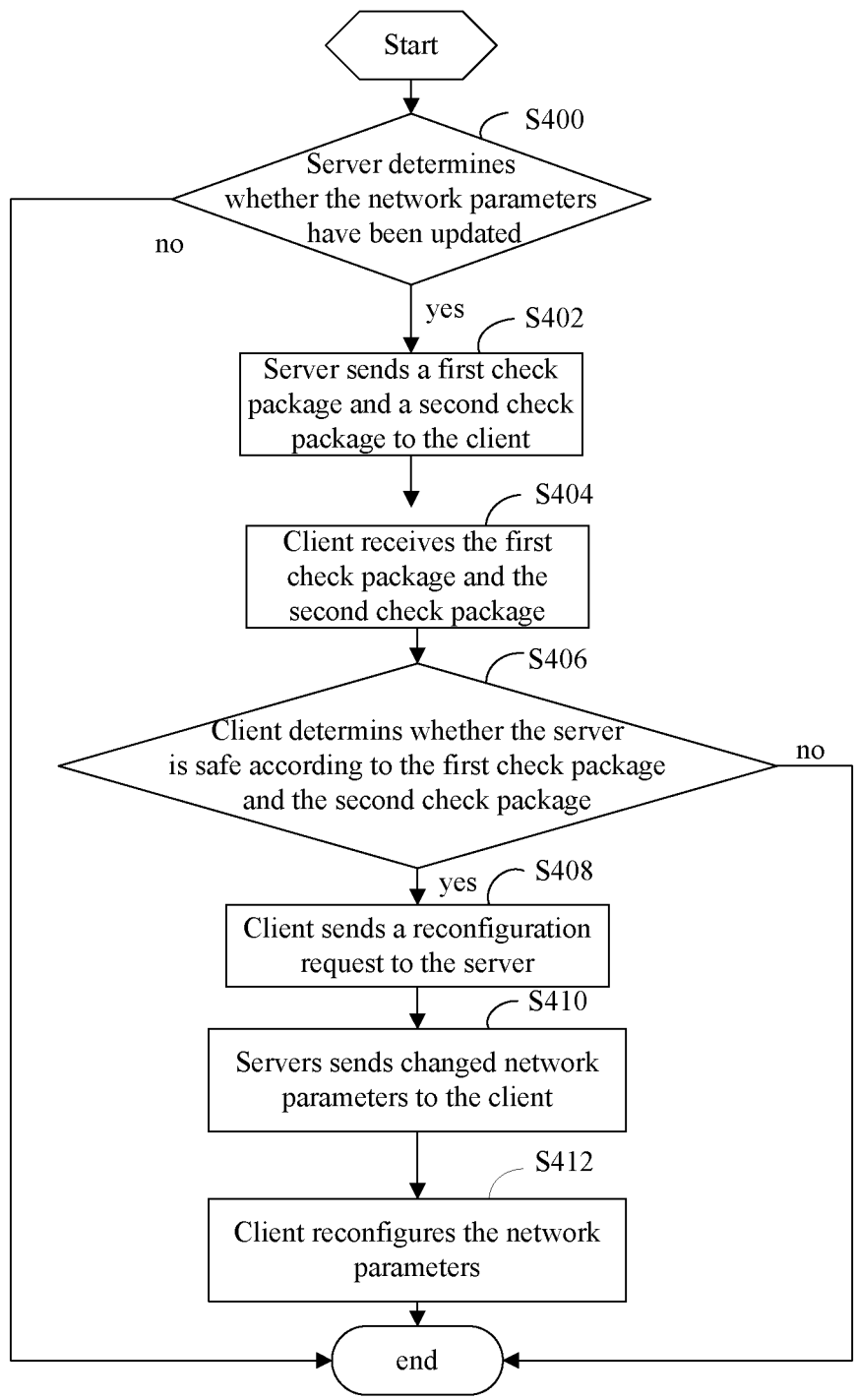
FIG. 4 is a flowchart of an embodiment of a method for reconfiguring network parameters.

FIG. 4 is a flowchart of an embodiment of a method of configuring network parameters.

In block S400, a first determining module of a server determines whether network parameters of a network have been updated.

In block S402, when the network parameters of the network have been updated, a first receiving and sending module of the server sends a first check package and a second check package to a client. The first check package and the second check package are used to determine whether it is safe to receive the updated network parameters from the server. In the present embodiment, the first check package includes a first media access control (MAC) address and a first number, and the second check package includes a second MAC address and a second number. In the present embodiment, the first MAC address and the second MAC address are both a MAC address of the server. The first number is generated randomly, and the second number is generated according to the first number and a preset relationship. In the present embodiment, the preset relationship is adding 1 to the first number to get the second number. In other embodiments, the second number can be generated according to the first number and a different preset relationship.

In block S404, a second receiving and sending module receives the first check package and the second check package sent by the server 10.

In block S406, a second determining module of the client determines whether or not the server is safe according to the first MAC address and the second MAC address, and further according to the first number and the second number. In the present embodiment, when the first MAC address is the same as the second MAC address, and a relationship between the first number and the second number is the preset relationship, the server is safe. Otherwise, if any of the first MAC address, the second MAC address, the first number, and the second number have been changed, the server is unsafe.

In block S408, when the server 10 is safe, the second receiving and sending module 200 sends a reconfiguration request to the server 10.

In block S410, the first receiving and sending module receives the reconfiguration request. When the reconfiguration request has been received, the first receiving and sending module sends the updated network parameters to the client.

In block S412, a reconfiguring module of the client reconfigures the network parameters according to the updated network parameters. In the present embodiment, when the client reconfigures the network parameters, the client can execute the functions of the network.

In another embodiment, the first check package and the second check package both include a MAC address of the server, and a random sequence number. The first check package and the second check package are encrypted with a sequential asymmetric approach and are sent to the client. Then, the client decrypts the first check package and the second check package with a public key so that the client can get the MAC address of the server and the random sequence number. Thus, security of receiving packages is increased.

In summary, the client in the present disclosure can determine a safe server to receive updates from, thus increasing security of received packages.

While various embodiments and methods have been described above, it should be understood that they have been presented by way of example only and not by way of limitation. Thus the breadth and scope of the present disclosure should not be limited by the above-described embodiments, and should be at least commensurate with the following claims and their equivalents.

What is claimed is:

1. A server connected with a client, the server comprising:
at least one processor; and
a storage system coupled to the processor, and storing at least one program executable by the processor, the program comprising instructions for:
determining whether or not network parameters corresponding to the client device have been updated;
sending a first check package and a second check package to the client device upon condition that the network parameters have been updated, wherein the first check package comprises a first MAC address and a first number, and the second check package comprises a second MAC address and a second number, wherein the client sends a reconfiguration request to the server in accordance with a determination that the server is safe according to a relationship between the first MAC address and the second MAC address and a relationship between the first number and the second number; and
receiving the reconfiguration request from the client device; and
sending the updated network parameters to the client device for reconfiguration by the client device.

2. The server of claim 1, wherein the first MAC address and the second MAC address are a MAC address of the server.

3. The server of claim 2, wherein the first number is generated randomly and the second number is generated according to the first number using a preset relationship.

4. The server of claim 3, wherein the server is safe upon condition that the first MAC address is same as the second MAC address and a relationship between the first number and the second number is the preset relationship.

5. The server of claim 1, wherein the first check package and the second check package are encrypted with a sequential asymmetric approach.

6. A client connected with a server, the client comprising:
at least one processor; and
a storage system coupled to the processor, and storing at least one program executable by the processor, the program comprising instructions for:
receiving a first check package and a second check package sent by the server upon condition that network parameters corresponding to the client have been updated, wherein the first check package comprises a first MAC address and a first number, and the second check package comprises a second MAC address and a second number;
determining whether or not the server is safe according to a relationship between the first MAC address and the second MAC address and a relationship between the first number and the second number;
sending a reconfiguration request to the server on condition that the server is safe;

receiving the updated network parameters from the server; and reconfiguring the client according to the updated network parameters.

7. The client of claim 6, wherein the first MAC address and the second MAC address are a MAC address of the server.

8. The client of claim 7, wherein the first number is generated randomly and the second number is generated according to the first number using a preset relationship.

9. The client of claim 8, wherein the server is safe upon condition that the first MAC address is same as the second MAC address and a relationship between the first number and the second number is the preset relationship.

10. The client of claim 6, wherein the first check package and the second check package are encrypted with a sequential asymmetric approach.

11. A method applied in a hardware server configuring network parameters for a client, the hardware server comprising at least one processor and a storage system, the method comprising:

Determining, by the at least one processor, whether or not network parameters corresponding to the client device have been updated;

sending, by the at least one processor, a first check package and a second check package to the client device upon condition that the network parameters have been updated, wherein the first check package comprises a first MAC address and a first number, and the second check package comprises a second MAC address and a second number, wherein the client sends a reconfiguration request to the hardware server in accordance with a determination that the hardware server is safe according to a relationship between the first MAC address and the second MAC address and a relationship between the first number and the second number; and receiving, by the at least one processor, the reconfiguration request from the client device; and sending, by the at least one processor, the updated network parameters to the client device for reconfiguration by the client device.

12. The method of claim 11, wherein the first MAC address and the second MAC address are a MAC address of the hardware server.

13. The method of claim 12, wherein the first number is generated randomly and the second number is generated according to the first number using a preset relationship.

14. The method of claim 13, wherein the hardware server is safe upon condition that the first MAC address is same as the second MAC address and a relationship between the first number and the second number is the preset relationship.

15. The method of claim 11, wherein the first check package and the second check package are encrypted with a sequential asymmetric approach.

* * * * *